(12) United States Patent
Felton

(10) Patent No.: US 6,690,359 B1
(45) Date of Patent: Feb. 10, 2004

(54) COMPUTER MOUSE DEVICE

(76) Inventor: Gail J. Felton, 252 Rossmore Court, Coquitlam BC V3K 5H3 (CA)

( * ) Notice: Subject to any disclaimer, the term of this patent is extended or adjusted under 35 U.S.C. 154(b) by 412 days.

(21) Appl. No.: 09/881,884

(22) Filed: Jun. 15, 2001

(51) Int. Cl.[7] .................................................. G09G 5/08
(52) U.S. Cl. ...................... 345/163; 345/157; 361/683
(58) Field of Search ................................ 345/156, 157, 345/163, 168; 248/118.5, 918; 361/686, 683; D14/405, 406

(56) References Cited

U.S. PATENT DOCUMENTS

| | | | |
|---|---|---|---|
| 5,260,696 A | | 11/1993 | Maynard, Jr. |
| 5,340,067 A | | 8/1994 | Martin et al. |
| D372,906 S | * | 8/1996 | Kawauchi et al. .......... D14/402 |
| 5,633,489 A | | 5/1997 | Dvorkis et al. |
| 5,731,807 A | * | 3/1998 | Feierbach .................... 345/163 |
| 5,847,696 A | * | 12/1998 | Itoh et al. .................... 345/163 |
| 5,870,081 A | | 2/1999 | Wu |
| D413,322 S | | 8/1999 | Sheehan et al. |
| 6,118,431 A | * | 9/2000 | Terrier et al. ................ 345/163 |
| 6,285,354 B1 | * | 9/2001 | Revis ........................... 345/163 |
| 6,348,912 B1 | * | 2/2002 | Smith .......................... 345/163 |
| 6,373,470 B1 | * | 4/2002 | Andre et al. ................. 345/166 |
| 6,429,851 B1 | * | 8/2002 | Vaghefi et al. .............. 345/163 |
| 6,433,779 B1 | * | 8/2002 | Woolman ..................... 345/163 |
| 6,489,947 B2 | * | 12/2002 | Hesley et al. ............... 345/163 |
| 6,580,420 B1 | * | 6/2003 | Wang .......................... 345/163 |
| 6,590,563 B1 | * | 7/2003 | Oross et al. ................. 345/163 |
| 2001/0005198 A1 | * | 6/2001 | Sakamoto et al. .......... 345/163 |

\* cited by examiner

*Primary Examiner*—Richard Hjerpe
*Assistant Examiner*—M. Fatahiyar

(57) ABSTRACT

A computer mouse device for controlling a cursor displayed on a personal computer. The computer mouse device includes a platform. An outer housing for grasping by a hand of an adult user is mounted on the platform. The outer housing includes a palm portion and a finger portion for resting a palm and fingers of a user thereon. The palm portion and the finger portion are releasably coupled together. A first pair of switches is depressibly mounted on the finger portion for operating the cursor. An inner housing having a second pair of switches depressibly mounted thereon for grasping by a hand of a child user is mounted on the platform. Control circuitry for controlling each of the switches is mounted in the inner housing. A control means for controlling movement of the cursor is mounted on the platform.

17 Claims, 4 Drawing Sheets

COMPUTER MOUSE DEVICE

BACKGROUND OF THE INVENTION

1. Field of the Invention

The present invention relates to computer mouse devices and more particularly pertains to a new computer mouse device for controlling a cursor displayed on a personal computer.

2. Description of the Prior Art

The use of computer mouse devices is known in thee prior art. More specifically, computer mouse devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,731,807; 5,340,067; 5,260,696; 5,633,489; U.S. Pat. No. Des. 413,322; U.S. Pat. No. 5,870,081; and 5,340,067.

While these devices fulfill their respective, particular objectives and requirements, the aforementioned patents do not disclose a new computer mouse device. The inventive device includes a platform. An outer housing for grasping by a hand of an adult user is mounted on the platform. The outer housing includes a palm portion and a finger portion for resting a palm and fingers of a user thereon. The palm portion and the finger portion are releasably coupled together. A first pair of switches is depressibly mounted on the finger portion for operating the cursor. An inner housing having a second pair of switches depressibly mounted thereon for grasping by a hand of a child user is mounted on the platform. Control circuitry for controlling each of the switches is mounted in the inner housing. A control means for controlling movement of the cursor is mounted on the platform.

In these respects, the computer mouse device according to the present invention substantially departs from the conventional concepts and designs of the prior art, and in so doing provides an apparatus primarily developed for the purpose of controlling a cursor displayed on a personal computer.

SUMMARY OF THE INVENTION

In view of the foregoing disadvantages inherent in the known types of computer mouse devices now present in the prior art, the present invention provides a new computer mouse device construction wherein the same can be utilized for controlling a cursor displayed on a personal computer.

The general purpose of the present invention, which will be described subsequently in greater detail, is to provide a new computer mouse device apparatus and method which has many of the advantages of the computer mouse devices mentioned heretofore and many novel features that result in a new computer mouse device which is not anticipated, rendered obvious, suggested, or even implied by any of the prior art computer mouse devices, either alone or in any combination thereof.

To attain this, the present invention generally comprises a platform. An outer housing for grasping by a hand of an adult user is mounted on the platform. The outer housing includes a palm portion and a finger portion for resting a palm and fingers of a user thereon. The palm portion and the finger portion are releasably coupled together. A first pair of switches is depressibly mounted on the finger portion for operating the cursor. An inner housing having a second pair of switches depressibly mounted thereon for grasping by a hand of a child user is mounted on the platform. Control circuitry for controlling each of the switches is mounted in the inner housing. A control means for controlling movement of the cursor is mounted on the platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer mouse device apparatus and method which has many of the advantages of the computer mouse devices mentioned heretofore and many novel features that result in a new computer mouse device which is not anticipated, rendered obvious, suggested, or even implied by any of the prior art computer mouse devices, either alone or in any combination thereof.

It is another object of the present invention to provide a new computer mouse device which may be easily and efficiently manufactured and marketed.

It is a further object of the present invention to provide a new computer mouse device which is of a durable and reliable construction.

An even further object of the present invention is to provide a new computer mouse device which is susceptible of a low cost of manufacture with regard to both materials and labor, and which accordingly is then susceptible of low prices of sale to the consuming public, thereby making such computer mouse device economically available to the buying public.

Still yet another object of the present invention is to provide a new computer mouse device which provides in the apparatuses and methods of the prior art some of the advantages thereof, while simultaneously overcoming some of the disadvantages normally associated therewith.

Still another object of the present invention is to provide a new computer mouse device for controlling a cursor displayed on a personal computer.

Yet another object of the present invention is to provide a new computer mouse device which includes a platform. An outer housing is mounted on the platform for grasping by a hand of an adult user. The outer housing includes a palm portion and a finger portion for resting a palm and fingers of a user thereon. The palm portion and the finger portion are releasably coupled together. A first pair of switches is depressibly mounted on the finger portion for operating the cursor. An inner housing having a second pair of switches depressibly mounted thereon for grasping by a hand of a child user is mounted on the platform. Control circuitry for controlling each of the switches is mounted in the inner housing. A control means for controlling movement of the cursor is mounted on the platform.

Still yet another object of the present invention is to provide a new computer mouse device that provides a comfortable mouse for adult and child users.

Even still another object of the present invention is to provide a new computer mouse device that combines a mouse for a child and a mouse for adults.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
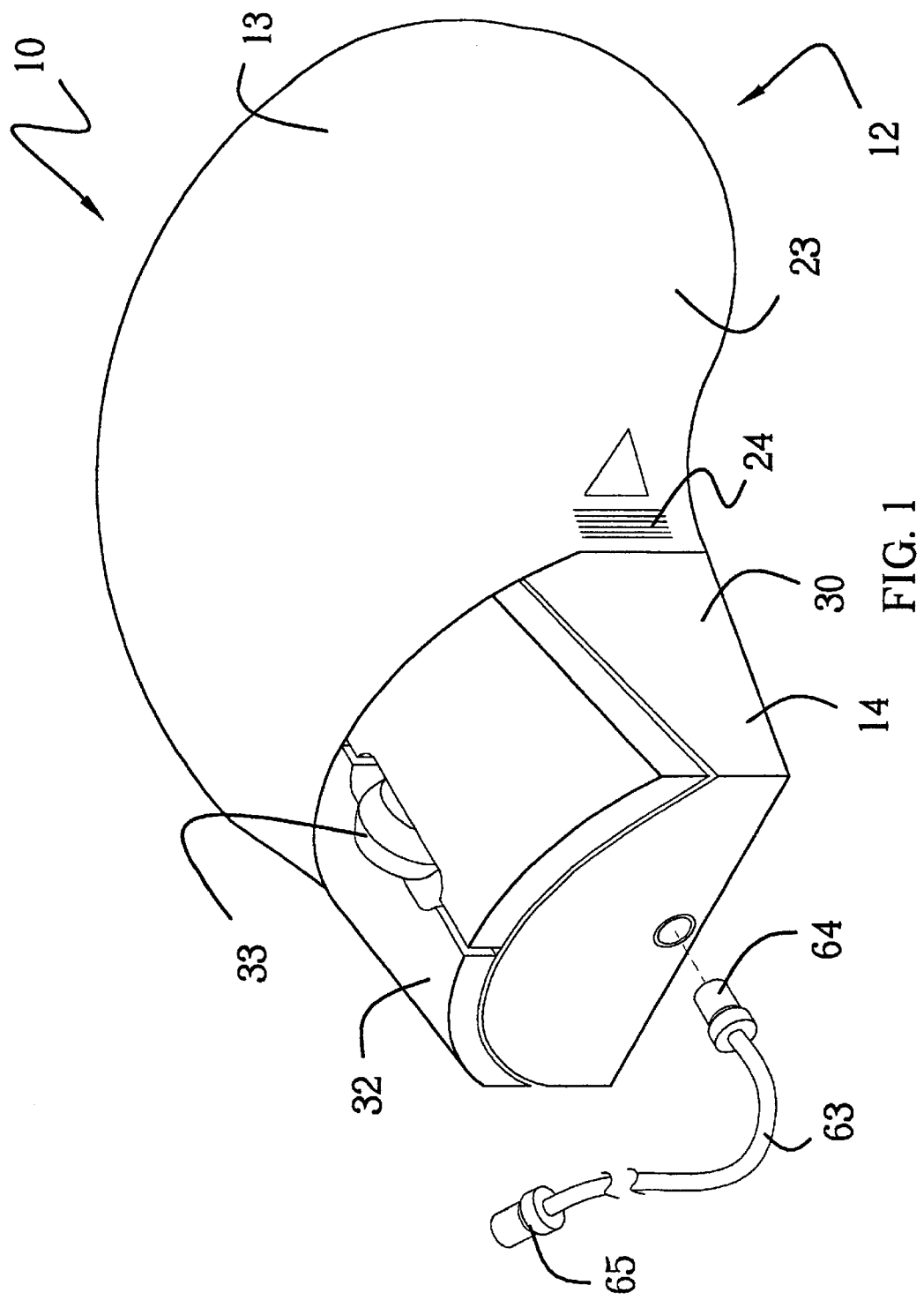
FIG. 1 is a schematic perspective view of a new computer mouse device according to the present invention.
Figure 2:
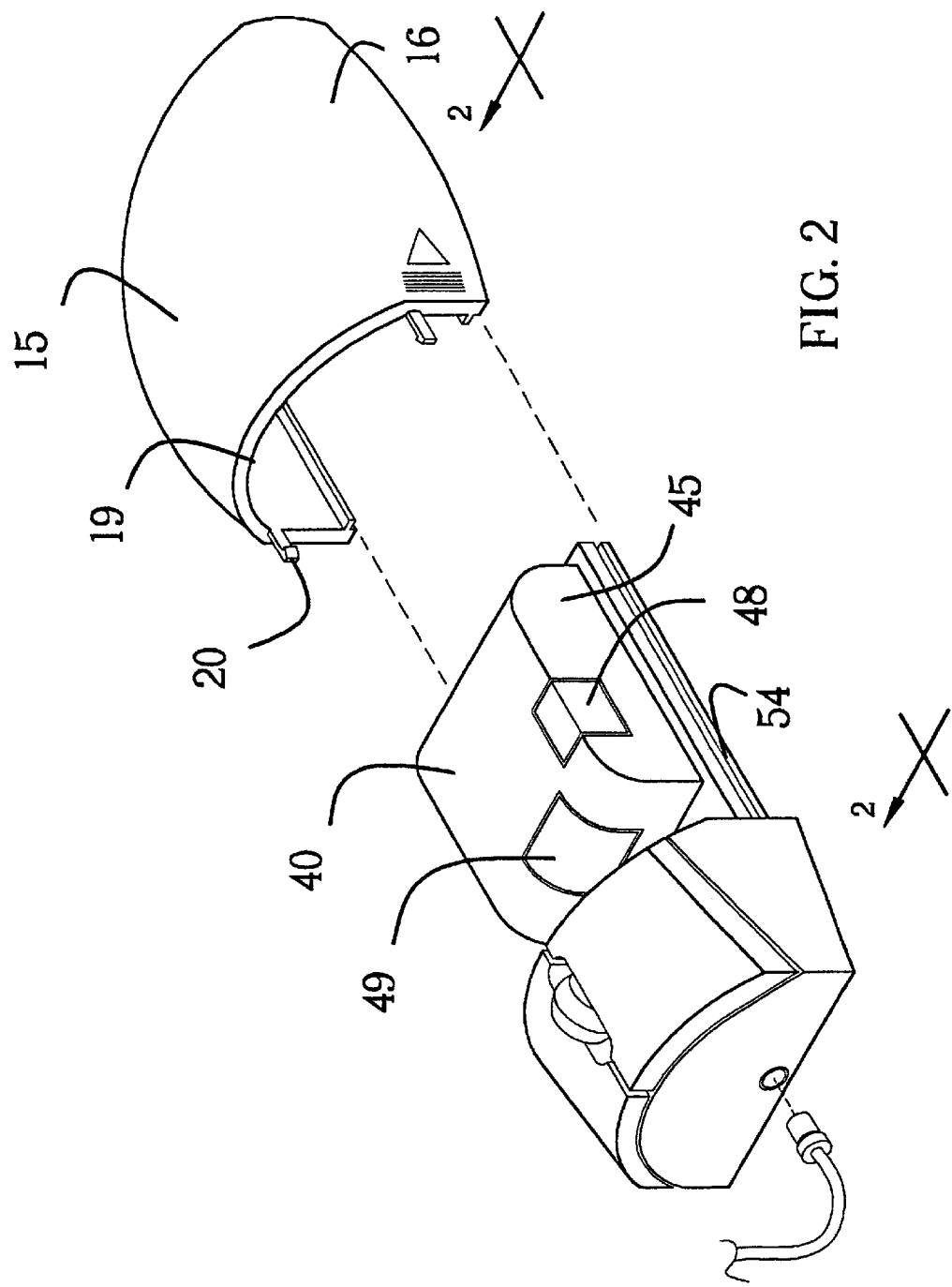
FIG. 2 is a schematic exploded view of the present invention.
Figure 3:
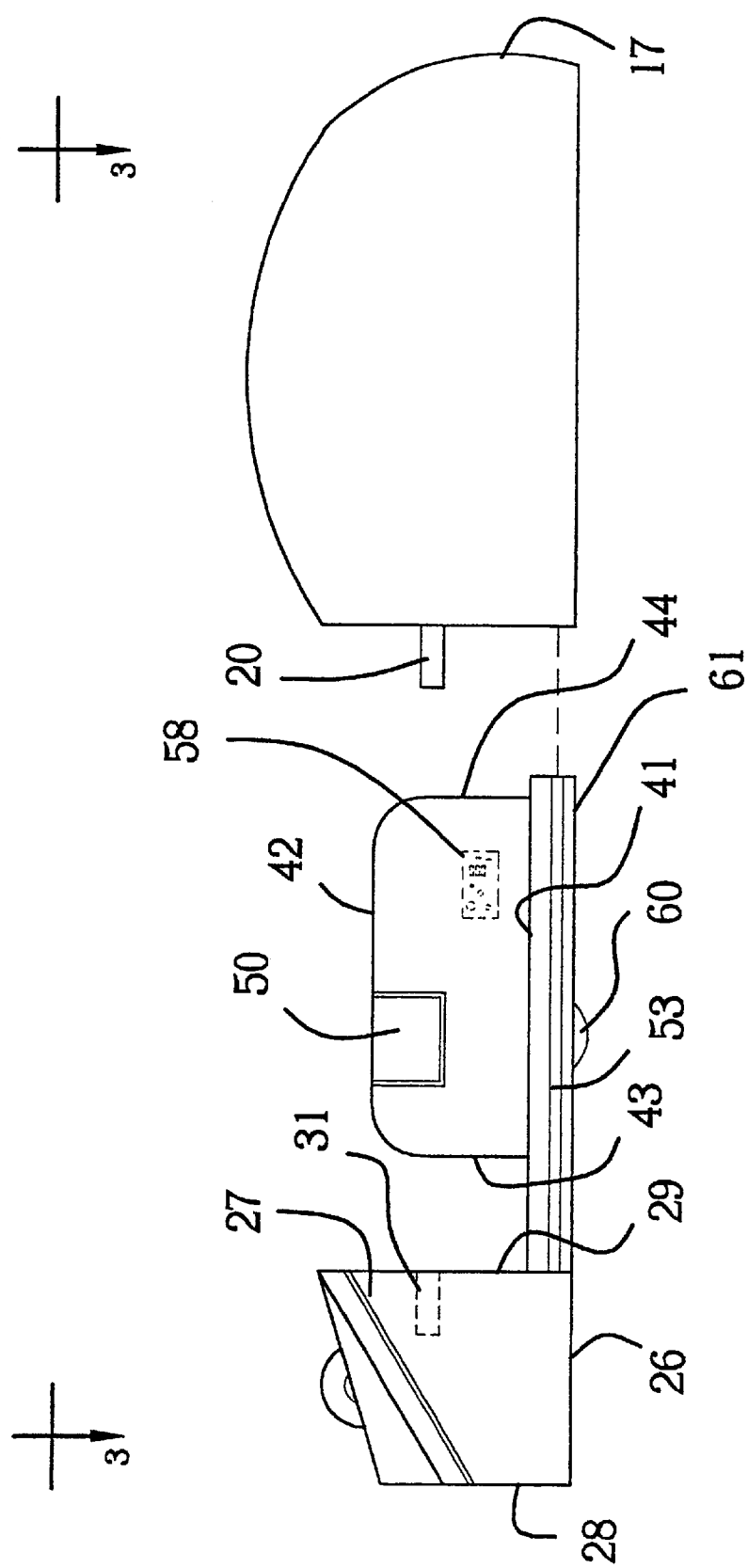
FIG. 3 is a schematic frontal view of the present invention.
Figure 4:
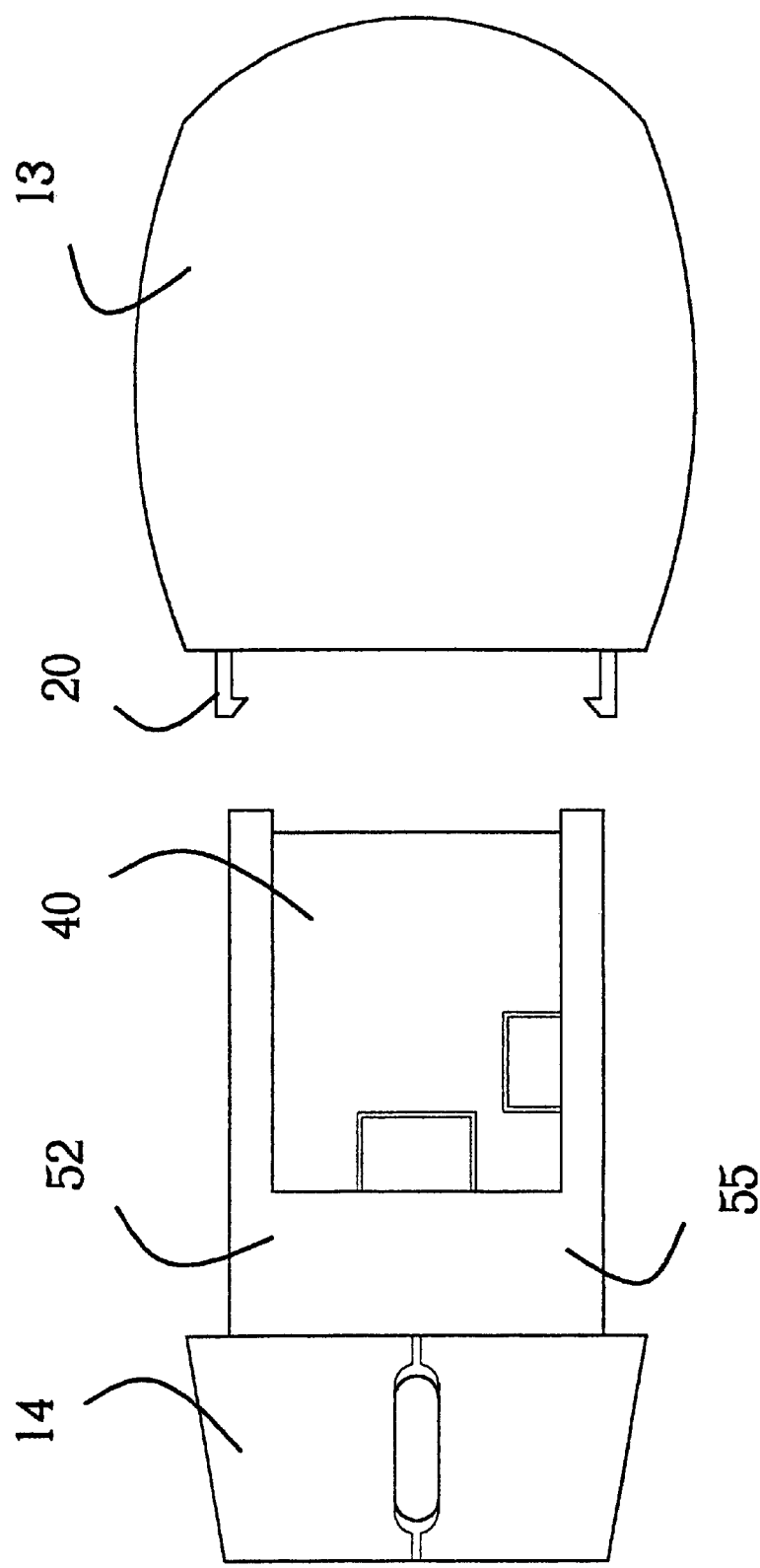
FIG. 4 is a schematic top view of the present invention.

With reference now to the drawings, and in particular to FIGS. 1 through 4 thereof, a new computer mouse device embodying the principles and concepts of the present invention and generally designated by the reference numeral 10 will be described.

As best illustrated in FIGS. 1 through 4, the computer mouse device 10 generally comprises an outer housing 12 for grasping by a hand of an adult user. A child user would also be able to operate the outer housing 12 although it may find it to be a bit more difficult due to the size of the outer housing 12. The outer housing 12 includes a palm portion 13 for resting a palm of a user and a finger portion 14 for resting fingers of a user. The palm portion 13 and the finger portion 14 are releasably coupled together.

In one embodiment of the present invention, the palm portion 13 has top wall 15, a pair of side walls 16 and an end wall 17. An edge 19 of each of the walls 15, 16 and 17 defines an open front and bottom of the palm portion 13. A front portion of the edge 19 of each of the side walls 16 may include a clip member 20 extending away therefrom. A bottom portion of the edge 19 of each of the side walls 16 may include a lip 22 formed thereon extending into the open bottom of the palm portion 13. An outer surface 23 of each of the side walls 16 may include a plurality of grooves 24 extending therein for providing an area to grip by the fingers of a user. Each of the grooves 24 is preferably positioned generally adjacent to one of the clip members 20.

In one embodiment of the present invention, the finger portion 14 has a bottom wall 26, a top wall 27, a front wall 28, a back wall 29 and a pair of side walls 30 extending between the top 27 and bottom 26 walls. The top wall 27 may gradually slope from the back wall 29 toward the front wall 28 of the finger portion 14. The back wall 29 of the finger portion 14 may include a pair of slots 31 extending therein for releasably receiving one of the clip members 20.

A first pair of switches 32 is provided for operating the cursor. Each of the first pair of switches 32 is depressibly mounted on the top wall 27 of the finger portion 14. Each of the first pair of switches 32 may include a generally arcuate shape designed for closely fitting on the top wall 27 of the finger portion 14.

A wheel 33 may be provided for controlling the cursor. The wheel 33 is preferably rotatably mounted on the top wall 27 of the finger portion 14. The wheel 33 may be positioned generally between each of the first pair of switches 32. The wheel may comprise a generally rigid material such as, for example, a plastic or semi-flexible rubber.

An inner housing 40 is provided for grasping by a hand of a child user. The inner housing 40 may include a bottom wall 41, a top wall 42, a front wall 43, a back wall 44 and pair of lateral walls 45. The juncture of the top wall 42 with the front 43 and back 44 walls of the inner housing 40 may have a generally rounded shape for providing a more comfortable housing for the hand of the user.

A pair of second switches 48 is provided for controlling the cursor. Each of the second pair of switches 48 is depressibly mounted on the top wall 42 of the inner housing 40. A first 49 of the pair of second switches 48 may be mounted on the juncture of the top wall 42 and the front wall 43 of the inner housing 40. A second 50 of the pair of second switches 48 may be mounted on a juncture of the top wall 42 and one of the lateral walls 45 of the inner housing 40. The first 49 of the pair of second switches 48 may include a generally arcuate shape.

A platform 52 may be provided for coupling the inner housing 40 to the outer housing 12. The platform 52 may be coupled to the back wall 29 of the finger portion 14. A pair of side edges 53 of the platform 52 may include groove 54 extending therein for releasably receiving the lip 22 of the palm portion 13. The inner housing 40 may be mounted on an upper surface 55 of the platform 52. In one embodiment of the present invention, the palm portion 13 selectively covers the inner housing 40 when coupled to the platform 52 and the finger portion 14.

Control circuitry 58 is provided for controlling each of the switches 37 and 48. The control circuitry 58 is preferably mounted in the inner housing 40. The control circuitry 58 is electrically connected to each of the switches 37 and 48.

A control means 60 is provided for controlling movement of the cursor. The control means 60 may be mounted on a lower surface 61 of the platform 52. The control means 60 is electrically connected to the control circuitry 58. The control means 60 may comprise a track ball or a track laser, however, other types of control means may be employed.

A plug 63 electrically connects the control circuitry 58 to the personal computer. An end 64 of the plug 63 is removably mounted on the front wall 28 of the finger portion 14. A second end 65 of the plug 63 is removably couplable to the personal computer. The plug 63 is electrically connected to the control circuitry 58.

In use, an adult user uses the outer housing 12 of the computer mouse device 10. The palm portion 13 of the outer housing 12 may be disconnected from the finger portion 14 and the platform 52 allowing a child user to use the inner housing 40 of the computer mouse device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computer mouse device for controlling a cursor displayed on a personal computer, said device comprising:
    a platform;
    an outer housing mounted on said platform for grasping by a hand of an adult user, said outer housing having a palm portion for resting a palm of a user thereon, a finger portion for resting fingers of a user thereon, said palm portion being removably mounted on said platform to permit selective removal of said palm portion from said platform;
    a first pair of switches for operating the cursor, each of said first pair of switches being depressibly mounted on said finger portion;
    an inner housing for grasping by a hand of a child user, said inner housing being mounted on said platform and being located in said outer housing when said palm portion is mounted on said platform;
    a pair of second switches for controlling a cursor, each of said second pair of switches being depressibly mounted on said inner housing;
    control circuitry for controlling each of said switches, first and second pair of said control circuitry being mounted in said inner housing; and
    a control means for controlling movement of the cursor, said control means being mounted on said platform.

2. The computer mouse device of claim 1, wherein said palm portion has a top wall, a pair of side walls and an end wall, an edge of each of said walls defining an open front and bottom of said palm portion.

3. The computer mouse device of claim 2, wherein a front portion of said edge of each of said side walls has a clip member extending away therefrom.

4. The computer mouse device of claim 2, wherein a bottom portion of said edge of each of said side walls has a lip formed thereon and extending into said open bottom of said palm portion.

5. The computer mouse device of claim 2, wherein an outer surface of each of said side walls has a plurality of grooves extending therein.

6. The computer mouse device of claim 3 wherein a back wall of said finger portion has a pair of slots extending therein for releasably receiving one of said clip members.

7. The computer mouse device of claim 1, wherein a top wall of said finger portion gradually slopes from a back wall toward said front wall of said finger portion, each of said first pair of switches having a generally arcuate shape adapted for closely fitting on said top wall of said finger portion.

8. The computer mouse device of claim 1, additionally including a wheel for controlling a cursor, said wheel being rotatably mounted on a top wall of said finger portion.

9. The computer mouse device of claim 1, wherein a juncture of a top wall of said finger portion with a front and a back wall of said inner housing has a generally rounded shape.

10. The computer mouse device of claim 1, wherein a first of said pair of second switches is mounted on a juncture of a top wall and a front wall of said inner housing, a second of said pair of second switches being mounted on a juncture of said top wall and one of a pair of lateral sides of said inner housing.

11. The computer mouse device of claim 10, wherein said first of said pair of second switches has a generally arcuate shape.

12. The computer mouse device of claim 4, wherein said platform is coupled to a back wall of said finger portion, a pair of side edges of said platform each having groove extending therein for releasably receiving said lips of said palm portion such that said palm portion selectively covers said inner housing when coupled to said platform.

13. The computer mouse device of claim 1, wherein said control means is mounted on a lower surface of said platform.

14. The computer mouse device of claim 13, wherein said control means comprises a track ball.

15. The computer mouse device of claim 13, wherein said control means comprises a track laser.

16. The computer mouse device of claim 1, additionally including a plug electrically connecting said control means to the personal computer, an end of said plug being removably mounted on a front wall of said finger portion, a second end of said plug being removably couplable to the personal computer.

17. A computer mouse device for controlling a cursor displayed on a personal computer, said device comprising:
    an outer housing for grasping by a hand of an adult user, said outer housing having a palm portion for resting a palm of a user thereon and a finger portion for resting fingers of a user thereon, said palm portion and said finger portion being releasably coupled together;
    wherein said palm portion has a top wall, a pair of side walls and an end wall, an edge of each of said walls defining an open front and bottom of said palm portion, a front portion of said edge of each of said side walls having a clip member extending away therefrom, a bottom portion of said edge of each of said side walls having a lip formed thereon and extending into said open bottom of said palm portion, an outer surface of each of said side walls having a plurality of grooves extending therein, each of said grooves being positioned generally adjacent to one of said clip members;

wherein said finger portion has a bottom wall, a top, wall a front wall, a back wall and a pair of side walls extending, said top wall gradually sloping from said back wall toward said front wall of said finger portion, said back wall of said finger portion having a pair of slots extending therein for releasably receiving one of said clip members;

a first pair of switches for operating the cursor, each of said first pair of switches being depressibly mounted on said top wall of said finger portion, each of said first pair of switches having a generally arcuate shape adapted for closely fitting on said top wall;

a wheel for controlling a cursor, said wheel being rotatably mounted on said top wall of said finger portion, said wheel being positioned generally between each of said first pair of switches;

an inner housing for grasping by a hand of a child user, said inner housing having a bottom wall, a top wall, a front wall, a back wall and a pair of lateral walls, a juncture of said top wall with said front and back walls of said inner housing having a generally rounded shape;

a pair of second switches for controlling a cursor, each of said second pair of switches being depressibly mounted on said top wall of said inner housing, a first of said pair of second switches being mounted on said juncture of said top wall and said front wall of said inner housing, a second of said pair of second switches being mounted on a juncture of said top wall and one of said lateral sides of said inner housing, said first of said pair of second switches having a generally arcuate shape;

a platform coupling said inner housing to said outer housing, said platform being coupled to said back wall of said finger portion, a pair of side edges of said platform each having groove extending therein, said lip of said palm portion being removably inserted in each of said grooves, said inner housing being mounted on an upper surface of said platform, wherein said palm portion selectively covers said inner housing when coupled to said platform and said finger portion;

control circuitry for controlling each of said switches, said control circuitry being mounted in said inner housing, said control circuitry being electrically connected to each of saids first and second pair of switches;

a control means for controlling movement of the cursor, said control means being mounted on a lower surface of said platform, said control means being electrically connected to said control circuitry, said control means comprising a track ball; and a plug electrically connecting said outer and inner housings to the personal computer, an end of said plug being removably mounted on said front wall of said finger portion, a second end of said plug being removably couplable to the personal computer, said plug being electrically connected to said control circuitry.

\* \* \* \* \*